A. L. PEARCE.
DISH WASHING MACHINE.
APPLICATION FILED JULY 9, 1908.

934,346.

Patented Sept. 14, 1909.

Witnesses
Daniel Webster, Jr.
M. R. Cleeland

Inventor
Abraham Lincoln Pearce
By F. DeWitt Goodwin
Attorney

UNITED STATES PATENT OFFICE.

ABRAHAM LINCOLN PEARCE, OF PHILADELPHIA, PENNSYLVANIA.

DISH-WASHING MACHINE.

934,346. Specification of Letters Patent. Patented Sept. 14, 1909.

Application filed July 9, 1908. Serial No. 442,634.

*To all whom it may concern:*

Be it known that I, ABRAHAM LINCOLN PEARCE, a citizen of the United States, residing at Philadelphia, in the county of Philadelphia and State of Pennsylvania, have invented certain new and useful Improvements in Dish-Washing Machines, of which the following is a specification.

My invention relates to improvements in a dish washing machine and particularly relates to that class of dish washing machines having a casing rotatably mounted upon a bearing and said casing containing a receptacle for the dishes, which receptacle is adapted to remain practically stationary.

The object of my invention is to provide a novel form of bearing for said casing and for said dish receptacle, which will permit the dish receptacle to be readily inserted in the casing and removed therefrom; a further object of my invention is to construct the bearing so as to avoid the necessity of having a shaft projecting through the bottom of the casing, thus I avoid the use of a stuffing-box to prevent the casing from leaking at the bearing.

Figure 1:
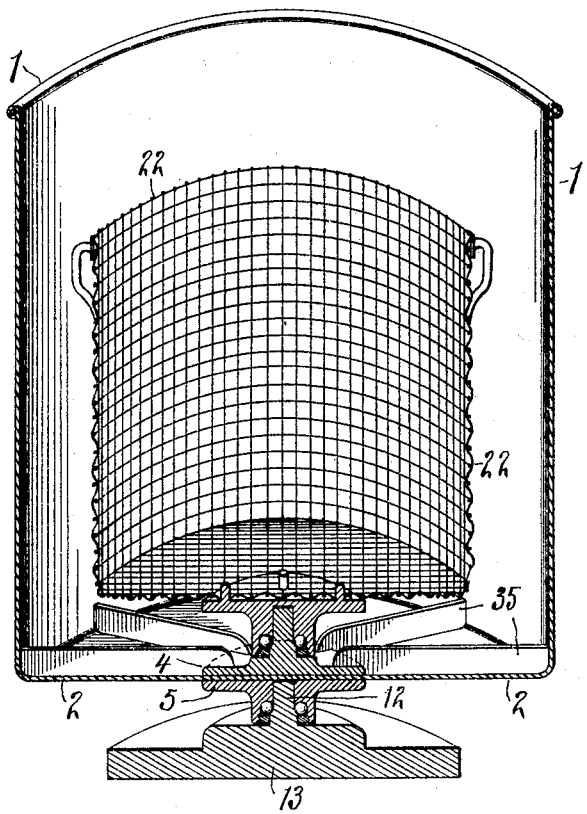
Figure 2:
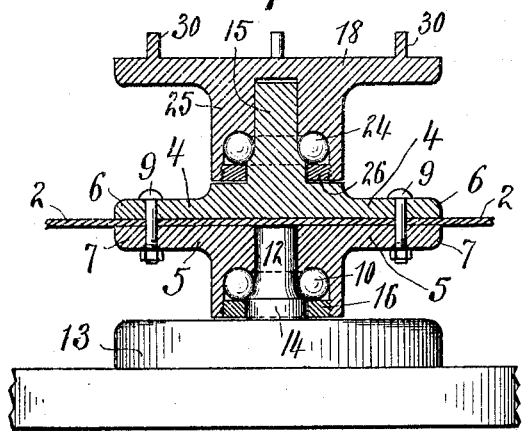
Figure 3:
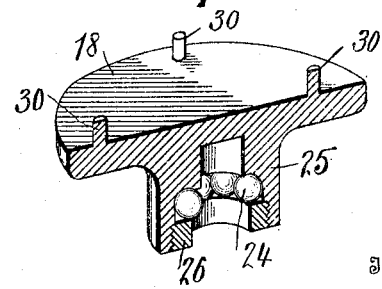

Referring to the drawing: Figure 1. is a vertical sectional view, in perspective, of a dish washing machine with my improvements embodied therein; Fig. 2. is a vertical sectional view of the bearing, drawn on a larger scale; Fig. 3. is a sectional perspective view of the disk for carrying the dish receptacle.

In the drawings 1 represents the outside casing of the dish washing machine, which is preferably cylindrical in form and is provided with a bottom 2. In the center of the bottom 2 is secured the bearing, consisting of an inner member 4 and an outer member 5. Said members are each provided with broad flanges 6 and 7 for securing the said inner and outer members together and to the bottom 2 of the casing. Said flanges are secured by bolts 9 by which they may be drawn tightly together and rigidly secured on the bottom 2 of the casing.

The outer member 5 of the bearing is provided with an aperture to receive the shaft 12, secured in the base 13.

The shaft 12 has a shoulder 14 formed thereon and the member 5 is provided with a series of balls 10 which bear against the said shoulder to carry the weight of the washing machine and permit the casing 1 to turn freely. A collar 16 is provided to hold the balls in place when the casing is lifted off the shaft 12 for the purpose of cleaning the casing or emptying the water out of the casing.

The inner member 4 is provided with a shaft 15 which projects into the center of the casing to receive the disk 18 which carries the wire dish receptacle 22. The shaft 15 has a shoulder formed thereon against which rest the balls 24 held in the hub 25 of the disk 18 by the collar 26. The ball-bearing thus formed between the disk 18 and the inner member 4 of the bearing will permit the bearing and the casing 1 to turn without turning the disk 18 which will remain practically stationary, due to the weight of the dishes and the action of the water in the casing as the latter is oscillated. The disk 18 is provided with a flat upper surface from which pins 30 project upwardly.

The dish receptacle 22 is made of woven wire with large meshes and said pins 30 will enter the meshes of the bottom of the dish receptacle and hold the latter upon the disk 18.

The operation of my invention is as follows: The casing 1 is filled about one-third full of hot water. The dish receptacle, after having the dishes placed therein, is inserted in said casing and rests upon the disk 18, upon which it is held by the pins 30, in the central portion of the casing 1, and held in an erect position so as not to touch the sides of the casing. The casing 1 is oscillated and the water agitated by the ribs 35, in the bottom of the casing, which will thoroughly wash the dishes. The dish receptacle may then be removed from the casing and the casing lifted off the base and the water emptied therefrom.

It will be seen by my improved bearing that the parts may be readily assembled; that the casing will turn freely upon the base; that the disk 18 will be firmly held in an upright position upon the shaft 15 and by providing a ball-bearing between the disk 18 and the inner member 4 of the bearing there will be so little friction between the parts that the disk carrying the dish receptacle will remain practically stationary when the casing is oscillated. It will be seen further that I avoid having a shaft running through the bottom of the casing which would require a stuffing-box to prevent the casing from leaking.

By providing the disk 18 with a broad flat surface the dish receptacle is well balanced upon the same and the pins 30 will readily enter the meshes in the bottom of the dish receptacle so that the dish receptacle may be readily inserted without adjusting it to any certain position.

Having thus described my invention I claim and desire to secure by Letters Patent.

1. In a device of the character described, the combination of a casing, a bottom formed in said casing, an inner member of a bearing secured on the inside of said bottom, a stud-shaft formed on the inner member of said bearing, a disk, a boss formed upon the under side of said disk, said boss having a recess formed therein to allow said boss to fit over the said stud-shaft, a dish receptacle supported upon said disk, a lower member of said bearing secured to the under side of said bottom and means for rotatably mounting said lower member of said bearing.

2. In a device of the character described, the combination of a casing, a bottom formed in said casing, an inner member of a bearing secured on the inside of said bottom, a stud-shaft formed on said inner member of said bearing, a disk loosely mounted upon said stud-shaft, a dish receptacle supported upon said disk, said dish receptacle having a bottom formed of wire mesh, said disk having pins formed thereon adapted to fit into the apertures of the wire mesh of the bottom of said dish receptacle, a lower member of said bearing secured to the under side of the bottom of said casing and means for rotatably mounting said lower member of said bearing.

In testimony whereof I affix my signature in presence of two witnesses.

ABRAHAM LINCOLN PEARCE.

Witnesses:
E. D. PATTERSON,
M. R. CLEELAND.